United States Patent [19]
Long

[11] Patent Number: 5,890,014
[45] Date of Patent: Mar. 30, 1999

[54] SYSTEM FOR TRANSPARENTLY IDENTIFYING AND MATCHING AN INPUT/OUTPUT PROFILE TO OPTIMAL INPUT/OUTPUT DEVICE PARAMETERS

[75] Inventor: William A. Long, Laguna Niguel, Calif.

[73] Assignee: MicroNet Technology, Inc., Irvine, Calif.

[21] Appl. No.: 691,018

[22] Filed: Aug. 5, 1996

[51] Int. Cl.$^6$ .................................................. G06F 13/10
[52] U.S. Cl. ........................ 395/828; 395/500; 395/651; 395/828; 711/170
[58] Field of Search ................................. 395/326, 112, 395/703, 671, 500, 821, 651, 828

[56] References Cited

U.S. PATENT DOCUMENTS

| | | | |
|---|---|---|---|
| 5,467,432 | 11/1995 | Ota | 395/112 |
| 5,608,908 | 3/1997 | Barghouti | 395/703 |
| 5,615,368 | 3/1997 | Terashima et al. | 395/671 |
| 5,625,783 | 4/1997 | Ezekiel et al. | 395/352 |
| 5,692,140 | 11/1997 | Schmitt et al. | 395/326 |

*Primary Examiner*—Thomas C. Lee
*Assistant Examiner*—Douglas Rupert
*Attorney, Agent, or Firm*—Christie, Parker & Hale, LLP

[57] ABSTRACT

A system and method is provided for optimizing the data transfer performance between a host computer and a peripheral data storage device adapted to transfer data in accordance with an internal set of configurable, performance setting parameters which determine the device's data transfer performance. A device driver program evaluates the I/O request stream of application programs hosted by the computer, and identifies any patterns evident in the I/O request stream. Identified I/O request patterns are matched to a corresponding set of data storage device performance setting parameters, i.e., mode parameter pages, which have been predetermined as able to optimize the data transfer performance of a data storage device for the identified I/O pattern. The new performance setting parameters are written to the data storage device which is operated in accordance therewith, thus tuning the data storage device for an application's I/O request pattern. An I/O emulator and characterization program determines various optimized performance setting parameters for a particular data storage device issuing I/O requests in an arbitrary pattern, iteratively adjusting the performance setting parameters, and evaluating the data transfer performance resulting from each parameter setting alteration until an optimized data transfer rate is achieved for that particular pattern.

3 Claims, 12 Drawing Sheets

Fig. 3

| Byte | Bit 7 | Bit 6 | Bit 5 | Bit 4 | Bit 3 | Bit 2 | Bit 1 | Bit 0 |
|---|---|---|---|---|---|---|---|---|
| 0 | Mode Select (6)   (15h) ||||||||
| 1 | LUN ||| | | PF | | SP |
| 2 | Reserved ||||||||
| 3 | Reserved ||||||||
| 4 | Transfer Length ||||||||
| 5 | Control Byte ||||||||

Fig. 4

| Byte | 7 | 6 | 5 | 4 | 3 | 2 | 1 | 0 |
|---|---|---|---|---|---|---|---|---|
| 0 | | | Mode Sense (6) (1Ah) | | | | | |
| 1 | LUN | | | Res | DBD | | Res | |
| 2 | PCF | | Page | | | | | |
| 3 | Reserved | | | | | | | |
| 4 | Transfer Length | | | | | | | |
| 5 | Control Byte | | | | | | | |

Fig. 5

| Byte | | Bit 7 | 6 | 5 | 4 | 3 | 2 | 1 | 0 | |
|---|---|---|---|---|---|---|---|---|---|---|
| 0 | 0 | \multicolumn{8}{c|}{Data Transfer Length Byte} | |
| 1 | 1 | \multicolumn{8}{c|}{Storage Medium Type} | |
| 2 | 2 | \multicolumn{8}{c|}{Device} | |
| 3 | 3 | \multicolumn{8}{c|}{Block Descriptor(s) Length (0Fh for 2 x 8-byte blocks)} | |
| 4 | 0 | | | | | | | | | |
| 5 | 1 | | | | | | | | | |
| 6 | 2 | | | | | | | | | |
| 7 | 3 | First Block Descriptor | | | | | | | | |
| 8 | 4 | (8 byte) | | | | | | | | |
| 9 | 5 | | | | | | | | | (0Fh) |
| 10 | 6 | | | | | | | | | |
| 11 | 7 | | | | | | | | | |
| 12 | 0 | | | | | | | | | |
| 13 | 1 | | | | | | | | | |
| 14 | 2 | | | | | | | | | |
| 15 | 3 | | | | | | | | | |
| 16 | 4 | | | | | | | | | |
| 17 | 5 | | | | | | | | | |
| 18 | 6 | | | | | | | | | |
| 19 | 7 | | | | | | | | | (2Ah) |
| 20 | 0 | \multicolumn{8}{c|}{Cache Page (08h)} | |
| 21 | 1 | \multicolumn{8}{c|}{Data Transfer Length} | |
| 22 | 2 | | | | | | | | | |
| 23 | 3 | | | | | | | | | |
| 24 | 4 | | | | | | | | | (06h) |
| 25 | 5 | | | | | | | | | |
| 26 | 6 | | | | | | | | | |
| 27 | 7 | | | | | | | | | |
| 28 | 0 | \multicolumn{8}{c|}{Disconnect-Reconnect Page (02h)} | |
| 29 | 1 | \multicolumn{8}{c|}{Data Transfer Length} | |
| 30 | 2 | | | | | | | | | |
| 31 | 3 | | | | | | | | | |
| ... | ... | | | | | | | | | (0Eh) |
| 42 | 14 | | | | | | | | | |
| 43 | 15 | | | | | | | | | |

Fig. 7

| Bit | 7 | 6 | 5 | 4 | 3 | 2 | 1 | 0 | |
|---|---|---|---|---|---|---|---|---|---|
| 0 | PS | Res | Caching Page (08h) | | | | | | |
| 1 | Page Length (0Eh) | | | | | | | | |
| 2 | IC | AP-F | CAP | DISC | SIZE | WCE | MULT | RCD | |
| 3 | Read Retention Priority | | | | Write Retention Priority | | | | |
| 4 | Disable Pre-Fetch Transfer Length | | | | | | | | |
| 5 | | | | | | | | | |
| 6 | Minimum Pre-Fetch | | | | | | | | |
| 7 | | | | | | | | | |
| 8 | Maximum Pre-Fetch | | | | | | | | |
| 9 | | | | | | | | | |
| 10 | Maximum Pre-Fetch Ceiling | | | | | | | | |
| 11 | | | | | | | | | |
| 12 | FSW | DRA | | | | | | | |
| 13 | Number of Cache Segments | | | | | | | | |
| 14 | Cache Segment Size | | | | | | | | (22h) |
| 15 | | | | | | | | | |
| 16 | | | | | | | | | |
| 17 | Non-Cache Segment Size | | | | | | | | |
| 18 | | | | | | | | | |
| 19 | | | | | | | | | |

BYTE

SYSTEM FOR TRANSPARENTLY IDENTIFYING AND MATCHING AN INPUT/OUTPUT PROFILE TO OPTIMAL INPUT/OUTPUT DEVICE PARAMETERS

FIELD OF THE INVENTION

This invention relates to a system and method for optimizing the performance of a data storage device, and more particularly to a software based device driver system which tunes the I/O performance of a data storage device in a run time environment, hosted and executed by a computer system.

BACKGROUND OF THE INVENTION

Most of the personal computer systems in use today, throughout the world, consist of little more than a central, arithmetic instruction processing unit, its associated main memory, basic input/output (I/O) control devices and a structured, architectured bus, provided on the computer's primary circuit board, onto which "peripheral" devices may be connected in order to make the computer system fully functional. Some of the more popular, and indeed necessary, of these expansion devices include sound cards, enhanced graphics adapters for video support, and I/O interface adapters which provide the capability for connecting peripheral data storage devices such as disk drives, CD-ROM drives, DAT tape drives, and the like, to the computer system. Although peripheral data storage devices are available in several architectures, the most prevalent peripheral devices operate in accordance with either an architecture termed IDE, an acronym for integrated device electronics, or an architecture termed SCSI, an acronym for small computer systems interface, and communicate with the computer system over a bus architecture termed either the IDE bus or the SCSI bus. The central instruction processing unit (CPU) executes the instructions of a particular application program, which, along with its attendant files and data, resides in main memory at the time of program execution. Accordingly, before an application program can be run, it must be loaded into main memory from a mass storage device, such as a disk drive. The data to be processed by the program is either accessed from the mass storage device or provided by an input device such as a keyboard. In well known fashion, the CPU accesses main memory at least once during the performance of each program step in order to read the corresponding machine instructions for that step. Indeed, several CPU access calls are usually required in order to read and write data.

Accordingly, main memory is very tightly coupled to the CPU by means of a main system bus, providing simplified and, above all, fast information transfer between memory and the CPU.

In contrast, mass storage devices, and other I/O devices such as keyboards and the like, are much further removed from the CPU and communication between such devices and the CPU is consequently slower and more complicated. Communication between the CPU and peripheral devices is accommodated over an interface such as IDE or SCSI, on the other end of which is an interface controller, which in turn communicates with the CPU in main memory.

Even though the configuration and architecture of a peripheral bus plays an important role in determining the I/O performance of a data storage device, the configuration and operational parameters of the device itself are more immediately important in determining such performance characteristics, particularly with regard to speed of the I/O (reads, writes, and seeks). The basic physical design of disk drives and the organization of data on the storage medium are pre-set during the disk drive manufacturing process. Also pre-set at the factory are the various control parameters which control the manner in which data is moved on and off of the storage medium, data block size, cache controlling, and the various transfer lengths of data being moved through the disk drive control circuitry between the data storage device and CPU. Not only do these factory pre-set parameters control the I/O performance of a typical disk drive, they have the effect of changing the drive's I/O performance characteristics depending on the size of a particular data transfer being performed between the drive and CPU.

For example, when the computer system is running a typical word processing application, a typical data I/O transfer size is in the 2 k to 4 k range, meaning that a relatively small amount of information is being communicated between a disk drive and the CPU during a typical I/O call. In contrast, when the computer system is executing a 3-D graphics, digital video editing, digital video capturing, or desktop publishing application, a typical I/O request will involve communicating data between the drive and CPU in 64 k to multi-megabyte transfer request sizes. If the disk drive I/O performance is factory pre-set to median values that allow an acceptable data transfer rate across a range of transfer sizes, it will be evident that optimum performance may not be achieved in any given band of transfer sizes, or indeed optimum performance may not be achieved at any data transfer size.

More recently, advances in computer hardware and software have strained the capabilities of disk drives to provide huge quantities of data on demand, in a timely manner. Full-motion video applications, complete with accompanying sound, pre-press data and video processing for large-scale publishing applications, and indeed Internet access, have all combined to present an all but insolvable problem to a disk drive with factory pre-set (pre-tuned) performance parameters. In particular, multi media and full motion video requires multi-megabyte sized data transfers between a storage device and the CPU without substantial loss of data. Under these conditions, a disk drive must be able to respond to a data read or write, no matter what the transfer size, as fast as technically possible.

One means by which present day systems address this problem is by storing information in a Redundant Array of Independent Drives (RAID) by using one of the various RAID protocols, at least data reads can be more quickly performed, because various portions of a particular file may be "striped" across two, or more, drives, each of which is read separately and the data combined in downstream processing circuitry.

While RAID offers some relief to the problems of providing fast data throughput, the RAID solution is not available for computer systems with single disk drives, or multiple disk drives not configured as an array. Furthermore, even in a RAID environment, the data throughput characteristics of each individual disk drive comprising the array is limited by its factory pre-set performance parameters. Thus, even when configured as an array, disk drive data transfer performance is not optimized for particular data transfer sizes, resulting in less than optimal overall data transfer times.

Because data transfer speed has become the hallmark of efficient computer operation, there is a need for a system which allows the individual performance characteristics of a disk drive to be optimized (tuned) to accommodate maximum data throughput at particular bands of data transfer sizes. Such a system should interactively determine a particular application's data throughput requirements, and dynamically adjust a drive's performance parameters in run-time mode. In addition, such a system should be able to evaluate the data throughput requirements of a particular application, log these requirements in a parameter set file, and provide an initial pre-tuned parameter set to a disk drive upon a corresponding application's being invoked, to further speed the dynamic, run-time parametric optimization.

SUMMARY OF THE INVENTION

In accordance with the invention, a system and method is provided for optimizing the data transfer performance between a host computer and a peripheral data storage device. The computer system executes application programs under its operating system program control, and includes a peripheral interface configured to transfer data between the host system and the peripheral data storage device in an I/O request stream. A device driver, implemented as a software or firmware routine, is resident in the host system's local memory and functions to dynamically tune the performance of the data storage device operating under its control during the device driver's runtime execution. The device driver includes an I/O profiler subroutine which profiles incoming I/O requests, made by the operating system to the device driver, as the device driver executes. The I/O profiler examines each incoming I/O request and identifies patterns in the stream of I/O requests in the form of an I/O profile. Identified I/O request patterns are identified to the device driver which determines if the internal performance parameter settings of the data storage device targeted by the operating system's I/O request are optimally configured to respond to the current requested I/O pattern. Depending on the outcome of the determination, new internal performance parameter settings are commanded by the device driver to the targeted data storage device, outside of the data stream so as to improve the target data storage device's data transfer rate performance and overall data throughput.

The system comprises a device driver which provides I/O requests from an application program executing on the host computer system to the peripheral data storage device in an I/O request stream. Means are provided which extract selected ones of I/O request type characteristics from the I/O request stream, thus defining a profile of the I/O request stream. Further means are provided which match the profile of an I/O request stream to a selected one of a set of predefined I/O request patterns, as well as means which identify the selected one of the set of I/O request patterns to a corresponding one of the set of predetermined data storage device performance setting parameters. The identified performance setting parameter set is operative to optimize data transfer performance of the peripheral data storage device for the identified I/O request pattern, when the peripheral data storage device is operated in accordance therewith.

In another aspect of the invention, the device driver includes an I/O profiler, which comprises a subroutine within the device driver. The I/O profiler evaluates the extracted I/O request type characteristics for particular I/O pattern types, which have been predefined and preprogrammed in a library of I/O pattern type characteristics. The I/O profiler evaluates the extracted I/O request type characteristics, compares the extracted characteristics to the library of predefined I/O patterns, and identifies the I/O request stream characteristics to a predefined pattern, and passes control back to the main device driver routine. The device driver, in turn, determines whether the identified I/O transfer pattern is being frequently requested, and whether the internal device mode parameter settings of the target data storage unit are optimal for the identified I/O request pattern.

In particular, the invention provides means for accessing an internal library of parameter settings for a predetermined set of mode parameter page values which have been identified to corresponding I/O transfer patterns, and which have been defined as optimal for data transfers in accordance with each corresponding pattern. The device driver recognizes whether a data storage device is operating in accordance with an optimal set of mode parameter page values, and if not, determines the optimal set of mode parameter page values for the particular I/O transfer pattern of interest, and commands those mode parameter page values to the data storage device.

In yet another aspect of the invention, an I/O emulator program executes outside of the runtime environment, and functions to characterize and profile the I/O performance of a particular data storage device in response to the demands of an emulated application program. The I/O emulator program issues an I/O request stream to a data storage unit in an arbitrarily defined I/O pattern. Mode parameter page values for the target data storage device are iteratively modified and the data transfer performance of the data storage device is evaluated after each iteration. Iterative alteration of the mode parameter values continues until no further improvement in data transfer performance is observed. The resulting mode parameter values are saved in a library of such mode parameter values, each set of values being identified as optimal for the specific I/O pattern conditions under which they were created.

BRIEF DESCRIPTION OF THE DRAWINGS

These and other features, aspects and advantages of the present invention will be more fully understood when considered with respect to the following detailed description, appended claims, and accompanying drawings, wherein:

FIG. 3 is a stylized representation of the structure and content of a Mode Select command as implemented by the SCSI command protocol;

FIG. 4 is a stylized representation of the structure of a Mode Sense command as implemented by the SCSI command protocol;

FIG. 5 is a stylized representation of the structure of a parameter list as implemented the SCSI command protocol;

FIG. 7 is a stylized illustration of the structure and content of the caching parameter page as implemented by the SCSI command protocol;

DETAILED DESCRIPTION OF THE PREFERRED EMBODIMENT(S)

The various embodiments of the present invention are implemented as a computer program.

Figure 1:
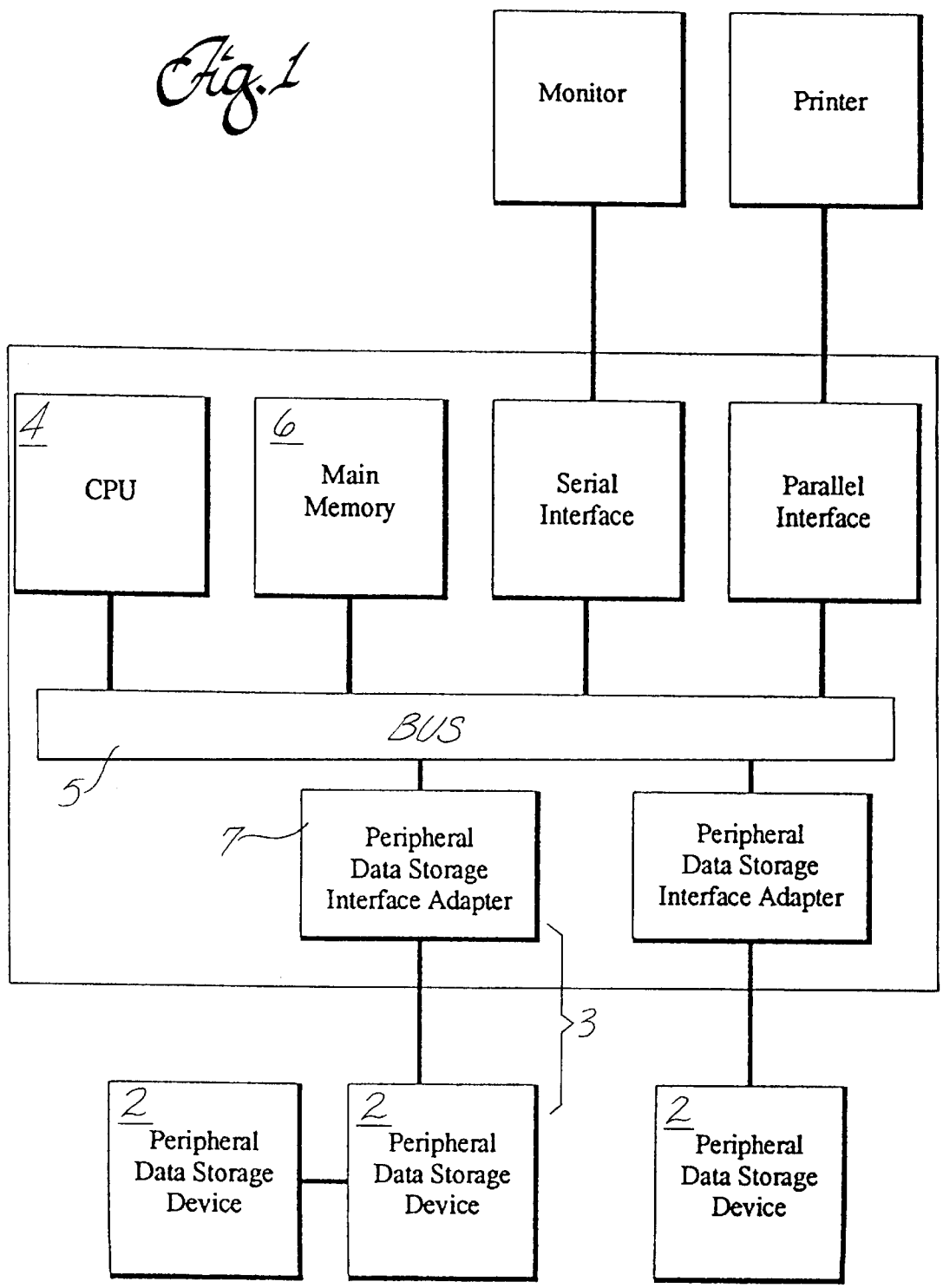
FIG. 1 is a block diagram of a computer system including an I/O interface useful for practice of principles of the present invention.

In FIG. 1, there is shown a block diagram of a computer system 1, which includes a peripheral data storage device 2 coupled to the computer system by means of an I/O interface 3 useful in practice of principles of the invention. The computer system includes an instruction processing component, such as a microprocessor 4, connected to transfer binary information across an internal bus 5, such as an ISA bus, IESA bus, PCI, VESA local bus, NuBus, and the like. The microprocessor 4 is the computer central processing unit (CPU) and is implemented preferably as a 32-bit microprocessor, such as one of the Motorola Power PC or 68XXX series of 32-bit microprocessors, manufactured by Motorola Corporation of Austin, Tex., or one of the Intel 80×86 series 32-bit microprocessors, manufactured by Intel Corporation of Santa Clara, Calif.

During operation of the computer system 1, the microprocessor 4 operates under preprogrammed instructions embodied in an operating system (OS), which is, conceptually, a software program that controls the function of the microprocessor 4 in an organized manner. In addition, the microprocessor carries out tasks assigned to it by various application programs, which are loaded and invoked by a user of the computer system, in order to accomplish a particular purpose. Various portions of the operating system and whichever application programs are in the process of being executed are typically contained in a high speed memory 6 connected to the microprocessor and reside in memory in an organized form such that instruction sequences are readily available to the microprocessor for execution.

Data, in the form of files, tables, partition maps, and the like, typically resides on a peripheral data storage device 2 which is coupled to the computer system 1 through an I/O interface 3. The I/O interface 3 typically comprises an I/O interface adapter 7 which is, in turn, coupled to the computer system's internal bus 5 for facilitating transfer of information between peripheral devices, such as disk drives, CD-ROM drives, tape drives, and the like, and the computer system's internal bus 5. The I/O interface adapter is typically embodied as a populated electronic printed circuit board, including all of the integrated circuitry required to implement a chosen one of the various I/O interface specifications and protocols currently available. Peripheral data storage device 2 is coupled to the interface adapter 7, in well known fashion, by means of a bus (in the illustrated embodiment the bus is a SCSI bus) comprising interface cables connected between the device and the adapter and which are provided for such purpose.

While the computer system is operating in accordance with preprogrammed instructions provided by, for example, an applications program, it must be able to communicate with various ones of peripheral devices. For example, the computer system must be able to display the results of its various operations on a monitor screen, so that the information may be provided in a form recognizable by a human user. In addition, a computer system must be able to communicate with a peripheral data storage device, such as a disk drive, in order to read and write data to the storage device in accordance with its preprogrammed instructions. When the computer system wishes to interact with a peripheral device, it does so through a species of executable, operating system level code, specific for each class of peripheral devices, called a device driver. Device drivers are executable, operating system level, sub-routines that may be created by an original equipment manufacturer of a particular peripheral device, or alternatively, they may be provided by the manufacturer of a computer operating system, or a provided by a third-party software supplier and provide I/O client services to the operating system whenever an application program needs to make an I/O call to a peripheral device.

In accordance with practice of principles of the invention, a device driver, implemented as a software or firmware routine, is resident in a computer system's local memory (execution RAM or ROM) and functions to dynamically tune the performance of a data storage device, such as a disk drive, operating under its control during the device driver's run time execution. The software implemented device driver, in accordance with the present invention, comprises an I/O profiler subroutine which, in a manner to be described in greater detail below, profiles incoming I/O requests, made by the operating system to the device driver, as the device driver executes. In practice, the I/O profiler examiners each incoming I/O request and "logs" the request parameters in an area of local execution RAM. From the logged I/O requests, the I/O profiler identifies patterns in the stream of I/O requests in accordance with an algorithm similar to that used in optical character recognition (OCR) for character pattern identification. Identified pattern statistics are then identified to the device driver which determines if the data storage device (or devices), targeted by the operating system's I/O request, are optimally configured to respond to the current requested I/O pattern. If not, the device driver issues a command which transfers new internal parameter settings to the targeted device or devices, (outside of the data stream) so as to improve the target device's data transfer rate performance and overall data throughput.

Consequently, the device driver of the present invention is able to optimize data throughput of a data storage device if the current I/O pattern of a particular application being run does not accommodate well the current internal parameter settings of a particular data storage device. If such a mismatch is determined by the device driver, including the I/O profiler, the driver is able to take immediate corrective action and reprogram the data storage device's parameter settings prior to the driver's servicing the operating system's I/O request. In this manner, the device driver according to the invention, is able to dynamically and continually tune the performance of a controlled data storage device regardless of inconsistencies and discontinuities of the I/O request stream during run time.

For purposes of this specification, data throughput (or band width or data rate) is defined as the amount of data which can be transferred over an interface in a given time. Data throughput is the product of the transfer rate in MHz times the interface bus width in bytes. For example, a 32-bit wide SCSI bus with a transfer rate of 10 M Hz provides a maximum, peak data throughput of about 40 Mbytes per second. However, this is only a theoretical maximum; true data throughput is typically measured as a function of a device's sustained transfer rate. For example, a disk drive typically has a sustained transfer rate of about 3 to 9 Mbytes per second. Generally, this is a measure of how fast data can be read from or written to the storage device's medium. Data transfer rate, as the term is used herein, is the speed at which data transfer occurs measured in MHz. In the case of 8-bit transfers, the data transfer rate is the same as data throughput in Mbtyes per second. Data transfer rate is often used to express serial data rates, such as the rate of data transfer to and from the read/write heads of a disk drive. In this case, a data transfer rate of 24 MHz corresponds to a throughput of about 3 Mbytes per second.

In accordance with practice of principles of the invention, the device driver is able to employ several different methods of tuning data storage device parameters to optimize performance for a particular I/O request pattern. In one embodiment of the invention, the device driver is preprogrammed with a particular target data storage device's specific I/O response characteristics for a wide range of predetermined I/O patterns. These specific I/O response characteristics may be easily determined by a person having ordinary skill in the art by, for example, bench testing a specific disk drive with a logic analyzer and mapping the drive's performance response to various changes to its internal operating parameters. In addition, several drive original equipment manufacturers (OEMs) provide information regarding the effects of changing individual parametric fields, which information may then be used as either a starting point for further bench testing, or may be used as an initial, "first approximation" file by the device driver as an aid to the driver's zeroing in on a final, fully optimal set of parameters.

If the preprogrammed I/O patterns are reflected in a particular application's I/O request stream, the device driver may elect to reprogram the device's performance parameters, before servicing the I/O request, with predetermined parameter values taken from a library containing predetermined device parameter settings for the present I/O pattern.

It should be mentioned, here, that "patterns" as defined in the context of the invention, comprise, inter alia, the transfer size of the I/O request, the number of I/O requests issued in a given time period, whether a request is frequently repeated (a repeat request), whether there are significantly more read requests than write requests (or vice versa), the absolute media position (absolute address) of the requests, and any absolute address periodicity pattern (ascending addresses, descending addresses, flaring address patterns, spiraling address patterns, or the like). Each I/O pattern element represents a performance tuning opportunity that is accomplished by reprogramming several different internal device parametric settings, in a manner to be described in greater detail below.

In an additional embodiment of the invention, the device driver is able to tune a data storage device even if the device driver does not recognize a pattern match for a particular I/O request stream. This situation may obtain if there has been no opportunity to bench test a particular storage device, or if a newly integrated disk drive has been installed in the computer system without the benefit of preconditioning. In this particular situation, the device driver may elect to perform a series of data throughput performance tests on the target data storage device, which emulate the current I/O request pattern being issued by the operating system. These performance tests are performed during the idle time between I/O's, and include iteratively changing the various internal device parametric settings and measuring data throughput rates until data transfer rates are maximized for the particular I/O pattern being emulated. Once optimization is achieved, the determined parametric settings for the particular I/O pattern being emulated are appended to a "device settings library", provided in a reserved memory area of the device driver's local memory space, and further identified with the corresponding I/O pattern with which they are associated, such that if the particular pattern reappears at some later time in the I/O stream, the appropriate parametric values may be fetched from the library, and device performance optimized. In this manner, the device driver, in accordance with the invention, is able to "learn" the optimum internal device parametric settings, for an initially unfamiliar device. Further, the device driver is able to adapt to new and unusual I/O request patterns, so long as the I/O request stream comprises some degree of periodicity.

In yet an additional embodiment, the device driver in accordance with the invention may elect to perform anticipatory device parametric setting changes in response to an "emerging" pattern of I/O requests. In particular, if the I/O profiler is preprogrammed to recognize an increasing or decreasing sequential read or write as such, after 30 sequential address calls by the operating system, an "emerging" pattern of sequential reads or writes may be recognized by the device driver after only, for example, 15 sequential absolute address calls. Thus, if the device driver detects and logs a long series of I/O requests which are becoming increasingly sequential, the driver is able to command a device's internal parameter settings to change in order to favor sequentially addressed I/O's, even before such a pattern triggers the I/O profiler's recognition threshold.

The above-described data storage device performance tuning techniques are embodied in an adaptive, software implemented device driver which functions to extract maximum data throughput performance from any data storage device it controls, even when I/O requests made by the operating system are inconsistent or unanticipated. Such inconsistent or unanticipated requests can easily occur in real world applications, such as when users of a computer system operating in a multitasking mode switch between programs with radically different I/O demands on the data storage system. For example, file servers, multi-media programs, image processing, and digital video capturing applications each make very different demands on the data storage system. However, incorporating an adaptive device driver, including an I/O profiler, in accordance with the present invention, is able to provide each application with data storage performance which is optimized for its particular needs.

In a specific embodiment of the invention, a typical computer system would include target data storage devices which communicate with the computer system over a Small Computer System's Interface (SCSI) as described in ANSI specification ANSI X3.131-199X (SCSI) or ANSI X3.131-1994 (SCSI-2). Data storage systems communicating over an SCSI interface are described in the exemplary embodiment of the invention, because of their rich support for internal device parametric settings. Even though the invention is described in the context of SCSI compatible devices, devices operating over this particular interface are not necessary for practice of principles of the invention. As will be immediately recognized by one having skill in the art, devices operating on other published interface specifications, such as IDE (integrated device electronics) and IPI, each provide support for internal device parametric settings, which may be adaptively extracted and modified to improve device data throughput performance in accordance with the invention.

The particular internal device parametric settings, used in the exemplary embodiment for controlling and optimizing target data storage device performance parameter settings comprise the on-drive Mode Pages, as described and implemented in the above-mentioned SCSI specifications.

In well known fashion, SCSI commands are issued across the SCSI bus as a sequence of bytes commonly termed a command descriptor block, issued to a target data storage device during the SCSI command phase. This command itself is always embedded within the context of an I/O process. The target data storage device collects command bytes from the command initiator and executes the command, during which the target device may decide to free the SCSI bus for other devices competing for service.

The SCSI interface supports a variety of data storage device types, from disk drives to CD-ROMs, optical storage devices, printers and scanners. While disk drives are a source as well as a destination of data transfer information communicated across the SCSI interface to the operating system, other device types such as printers only receive information, while scanners, for example, only send.

It will be understood that the information being discussed relates to data transfers. It is well known that printers, scanners, and other "1-way" types of peripheral data storage devices both send and receive command and status type information. Information transfer, in the context of the invention, relates to data. Accordingly, the SCSI protocol defines a number of data storage device classes. For each device class, the SCSI protocol defines a model, a command set and a set of parameter pages for configuring the operational parameters of the device.

Figure 2:
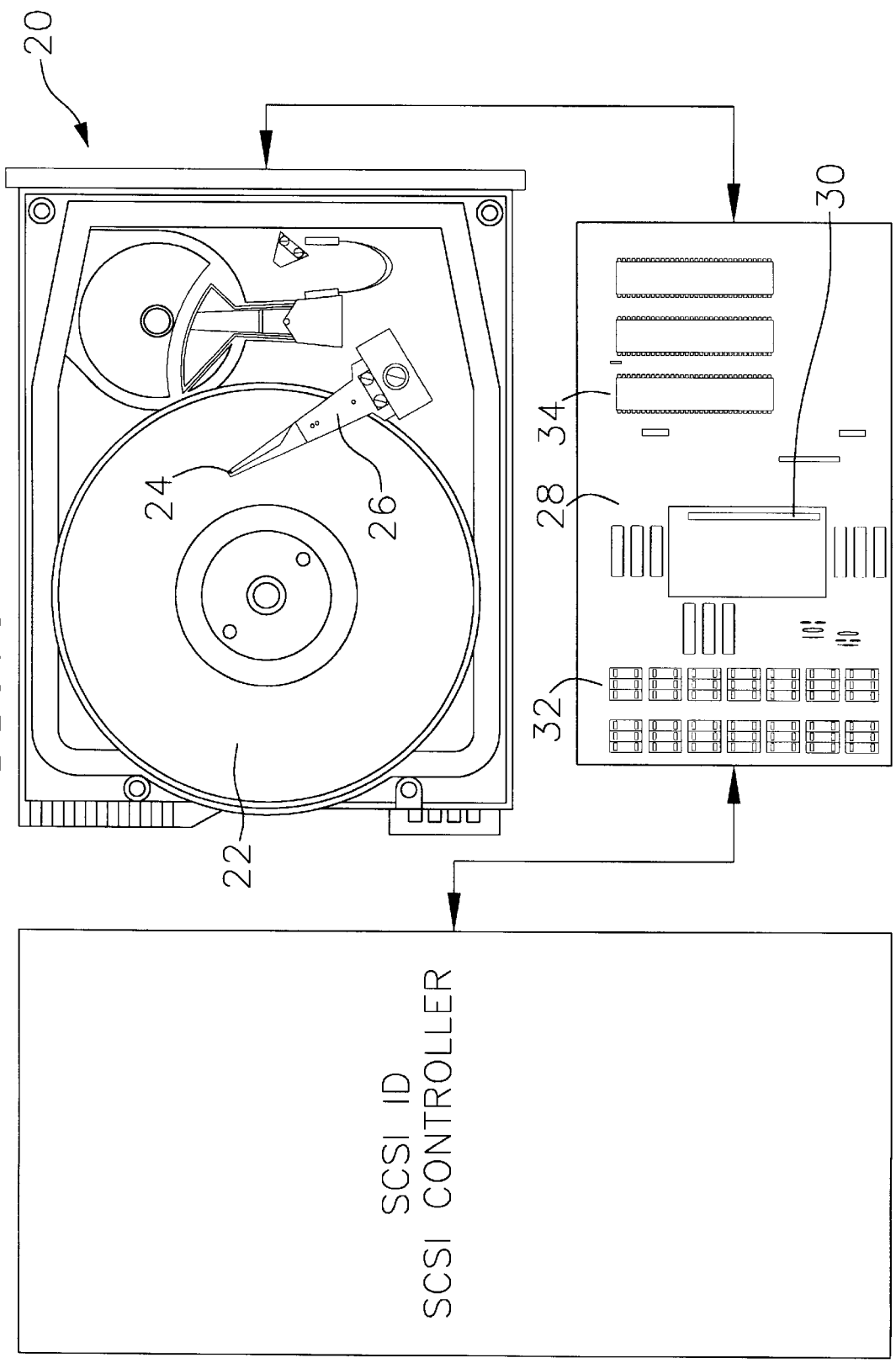
FIG. 2 is a block diagram of a disk drive in accordance with practice of principle the invention.

Turning now to FIG. 2, which depicts, in high level block diagrammatic form, a SCSI device (commonly termed a logical unit or LUN) 20. The SCSI device 20 is depicted in FIG. 2 as a disk drive for purposes of illustration. In well known fashion, the disk drive 20 comprises rotating disks 22 for magnetically storing data received from or to be sent to a host computer system. Means for transferring data on and off the rotating magnetic storage disks 22 suitably include read/write heads 24 suspended at the distal end of an actuator assembly 26, which moves the read/write heads, in arcuate fashion, across the major surface of a rotating magnetic storage disk 22. In well known fashion, data read from or written to the disk surface is processed through data channel electronics 28, whence it is communicated between the SCSI drive and host computer system over the SCSI interface bus.

The manner in which data is written to or read from the disk, as well as the manner in which the data channel electronics 28 handles the data, is determined by an electronic, integrated circuit controller 30, which in addition, provides command and control instruction signals that physically operate the mechanical systems of the disk drive.

In the case of the illustrated embodiment, where the controller is embedded within the SCSI drive, the controller 30 includes associated memory 32, which may be implemented either as part of the controller circuitry itself, or alternatively, as off-chip memory accessed by the controller over a local memory bus. Resident in the controller's memory 32 is a set of parameters that configure the operation of the SCSI device being controlled by the controller. Collectively, these parameters are commonly referred to as mode page parameters, and are able to be transmitted across the SCSI bus in data blocks which are commonly termed pages (or mode pages). As is often the case in the SCSI environment, particular ones of the above-mentioned mode pages are applicable to all devices which operate under the SCSI protocol, while other particular ones of the mode pages are applicable to only specific classes of SCSI devices, i.e., those which may only read or those which may only write, for example.

It will be evident to one having ordinary skill in the art, that although the foregoing has been described in terms of an SCSI disk drive, the general features of an SCSI peripheral data storage device mentioned above are applicable to any direct access block device. For example, in contrast to magnetic data storage, some disk drives store data optically on suitable optical media, and transfer data on and off optical media storage disks by means of lenses and optical sensors.

One feature that all SCSI device classes share in common, is the manner in which mode parameters are organized and maintained by a particular SCSI logical unit. A logical unit generally includes three copies of its mode parameters (the current parameters, the default parameters, and the saved parameters). Current parameters are those with which the device is presently functioning, and which typically reside in RAM memory 32. Saved mode parameter values are typically stored in some fashion of non-volatile memory, such as a reserved sector, or group of reserved sectors, comprising a configuration data file on the disk drive medium itself. As the SCSI device powers-up, the device controller 30 copies the saved values from the configuration file to on-board RAM 32, where they now function as the current mode parameter set.

Default mode parameter values are typically provided on the disk media, in a reserved area, termed a configuration section, which is down-loadable on command, or alternatively, hard-coded by a disk drive original equipment manufacturer into a programmable, read-only memory (PROM) 34 which is provided on the SCSI device for such purpose, as well as to hold power-on reset and boot-up routines, such that the drive will be functional even after having been removed from a power source. When the SCSI drive is initially manufactured, the saved mode parameter values reflect the default settings which have been determined as appropriate by the original equipment manufacturer. A SCSI command allows the default mode parameter settings to be copied from the PROM 34 (on the media) to the configuration file of the disk as the saved mode parameter values.

Additionally, there is a fourth set of parameters, termed the changeable parameters, that a target data storage device is able to access. The changeable parameter set is provided so that a data storage device is able to communicate to an initiator which of the individual parameters, of any of the mode pages, may be manipulated and to what extent. In this manner, a diagnostic program or conventional device driver is able to determine, for example, the range of sector sizes a disk drive will support, before arbitrarily attempting to define a value. The changeable mode parameter set may also be hard-coded into a disk drive's firmware, or be down-loadable from a configuration sector provided in a reserved area on a disk drive's storage medium provided for such purpose.

As will be evident to one having skill in the art, the current mode parameters are capable of being read from RAM, in response to a Mode Sense command issued by an appropriately configured SCSI device driver. In addition, the current mode parameters may be written to RAM with a Mode Select command, also issued by an appropriately configured device driver.

In accordance with the present invention, mode sense commands are appropriately issued to a SCSI device by hexadecimal 15 h or 5 Ah in the opcode byte of a SCSI command descriptor block. Likewise, a mode select command is issued to a SCSI device by appropriately commanding hexadecimal 1 Ah or 55 h in the opcode byte of a command descriptor block. As is well known to those familiar with SCSI interface protocols, there are 6-byte and 10-byte versions of both Mode Select and Mode Sense. Relative to a typical SCSI command, mode sense and mode select are complex, and invoke several parameters, each including a multiplicity of fields.

Turning now to FIG. 3, there is depicted, in diagrammatic form, typical 6-byte mode select command descriptor block, wherein each byte is represented by 8 bits, from 0 to 7. The first byte of the command, identified in FIG. 4 as byte 0, is the command's opcode, in this case 15 h which identifies the command as being a 6-byte mode select. Following the opcode, the second byte, identified as byte 1 in FIG. 4, is the identifier byte and includes the logical unit ID (bits 5,6, and 7), a page format field (bits 1–4) which identifies the parameter pages as being either SCSI-1 or SCSI-2 compliant, and a save pages field (bit 0). It should be noted that when the save pages (SP) bit is set, mode parameter changes will be written to the saved mode parameters, and will thus be valid at the next power-up cycle, as well as written to the current parameters. If the save pages (SP) bit is clear, mode parameter changes effect only the current mode parameter set.

As is shown in FIG. 3, bytes 3 and 4 (identified as 2 and 3 in FIG. 3) are reserved, while byte 5 is the transfer length of the data block which will comprise the actual new mode parameter information provided the SCSI drive. In well known fashion, byte 6 is the control byte which comprises a link bit and flag bit which function in combination to allow several commands to be chained together as a single I/O process.

Turning now to FIG. 4, there is depicted in diagrammatic form, an exemplary 6-byte mode sense command descriptor block. In a manner similar to the mode select command, the first byte of the mode sense command, byte 0, is the opcode (1 Ah) identifying the command as a 6-byte mode sense. The second byte, byte 1, comprises the logical unit ID (bits 5, 6 and 7), a reserved bit (bit 4), a disable block descriptor bit (DBD, bit 3) which disables the transmission of block descriptors before the mode pages when set, and a further reserve field comprising bits 0, 1 and 2. The third byte, byte 2, comprises a page control field (PCF), bit 6 and 7) which identifies which mode parameter pages are to be sensed: 00 identifies current mode parameter values, 01 identifies changeable values, 10 identifies default values, and 11 identifies save mode parameter values. The third byte, byte 2, further comprises a page code field (bits 0–5) which identifies the particular mode parameter page desired. The fourth byte, byte 3, is reserved, while the data transfer block length is given in the fifth byte, byte 4. As was the case with the mode select command of FIG. 3, the final, 6th byte, byte no. 5, is the control byte.

Given that both the mode select and mode sense commands are parameter orient commands, a parameter list, of the type depicted in diagrammatic form in FIG. 5, follows the command descriptor block. As is shown in FIG. 5, the parameter list for both mode select and mode sense commands are generally similar. This similarity is very useful, in the context of the present invention, in that a device driver may read the mode parameters from a target SCSI device with mode sense, edit them in memory, and write them back to the SCSI device with mode select. The exemplary parameter list of FIG. 5 comprises three basic elements. A mode parameter header, comprising the first 4 bytes of the parameter list, identifies the transfer length, or mode data length of the entire parameter list in bytes, the media type, the device type, and the block descriptor length which defines the logical block length of all or part of the data storage device data storage medium. The second element of the parameter list comprises one or more block descriptors, as defined in the block descriptor length byte of the mode parameter header. The block descriptor includes information relating to, for example, write density for popular densities of floppy drives; the number of blocks that the particular block descriptor defines; and the number of bytes per logical block for the blocks defined by the particular block descriptor.

The third and most important element of the parameter list is the mode parameter page itself. As can be seen from FIG. 5, a mode parameter page begins with the page code identifier in byte 0, which also includes a parameter savable (PS) bit which indicates that the target data storage device is able to save the parameters comprising the mode parameter page. In accordance with the SCSI interface specification, the parameter savable (PS) bit is only defined for the mode sense command. The next byte, byte 1, of the mode parameter page contains the page length. In well known fashion, mode parameter pages vary in length but none are more than 255 bytes in length. Finally, the mode parameters themselves comprise bytes 2 thru n, with the total length of each mode parameter page being defined by the page length field, and the total length of the entire parameter list being defined by the mode data length (transfer length) field of the mode parameter header.

Most mode parameter pages are device specific, and are defined in the SCSI specification pertinent to that particular data storage device. The mode parameter pages defined in the SCSI interface specification are reproduced below in tabular form, in Table 1.

TABLE 1

| Code | Mode Parameter Pages |
|---|---|
| 00h* | Vendor specific |
| 01h* | Read/write error page |
| 02h* | Disconnect-reconnect page |
| 03h* | Format page |
| 03h | Parallel interface page |
| 03h | Measurement units page |
| 04h* | Rigid disk geometry page |
| 04h | Serial interface page |
| 05h* | Flexible disk page |
| 05h | Printer options page |
| 06h | Optical memory page |
| 07h* | Verification error page |
| 08h* | Caching page |
| 09h* | Peripheral device page |
| 0Ah* | Control mode page |
| 0Bh* | Medium type page |
| 0Ch* | Notch partitions page |
| 0Dh | CD-ROM page |
| 0Eh | CD-ROM audio page |
| 10h | Device configuration page |
| 11h | Medium partitions page 1 |
| 12h | Medium partitions page 2 |
| 13h | Medium partitions page 3 |
| 14h | Medium partitions page 4 |
| 1Dh | Element address assignment page |
| 1Eh | Transport geometry page |
| 1Fh | Device capabilities page |
| 3Fh* | All available pages |

A * symbol next to a parameter page code denotes a parameter page which contains values applicable to disk drives.

As can been seen from review of Table 1, several of the mode parameter pages are not pertinent to the disk drive of the exemplary embodiment. For example, the CD-ROM page and the CD-ROM audio page, identified as 0 Dh and 0 Eh comprise mode parameters which are specific to CD-ROMs. However, of particular interest is mode page code 3 Fh, which allows a mode sense command to read all of the mode parameter pages maintained by a particular SCSI data storage device. Preferably, the mode parameter pages used in the exemplary embodiment of the invention, are pages 2 (02 h, disconnect-reconnect control parameters) and 8 (08 h, the caching page). It has been determined by the inventors of the present invention, that adjusting the parameter values within defined fields in these particular mode pages, results in significant, predictable, and measurable alterations to the behavior of a data storage device with regard to its overall data transfer rate performance.

Figure 6:
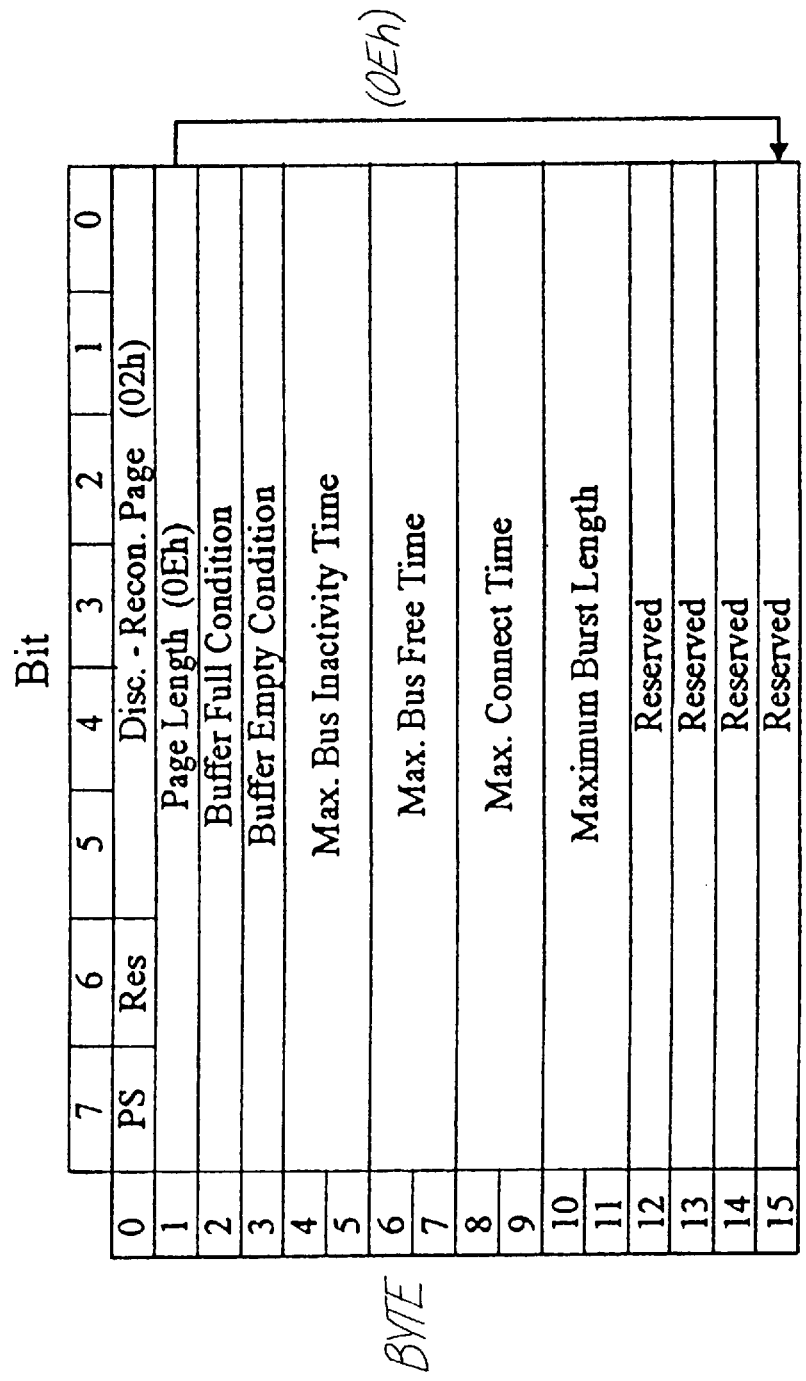
FIG. 6 is a stylized representation of the structure and content of the disconnect-reconnect parameter page as implemented by the SCSI command protocol.

Turning now to FIG. 6, an exemplary disconnect-reconnect page is depicted in diagrammatic form, identifying the parameter fields that are able to be modified by the device driver in accord with practice of principles of the invention. The disconnect-reconnect parameter page of FIG. 6 comprises an identifier byte (byte 0) and a page length byte (byte 1) which functions to set the appropriate pointers for reading the page. The actual fields able to be modified by the device driver include the buffer full ratio (byte 2) buffer empty ratio (byte 3), the bus inactivity limit (bytes 4 and 5), the disconnect time limit (byte 6 and 7), the connect time limit (bytes 8 and 9), and the maximum burst size (bytes 10 and 11). In accordance with the SCSI specification, the buffer full ratio determines, for read operations, how full the data buffer should be before a target SCSI device attempts a reconnect to the SCSI bus and thence to the host computer system. The buffer empty ratio performs the same function in the same manner for write operations (it defines how empty the data buffer must be before a target SCSI device attempts to reconnect to the bus). The bus inactivity limit, disconnect time limit, and connect time limit, defines the period of time that a particular device may idly occupy the SCSI bus (without sending or receiving data), the minimum period of time that a device must wait after freeing the bus before it attempts a reconnect, and the absolute maximum period of time that a particular device may occupy the bus, respectively. Generally, these time limits are defined in 100 microsecond increments. Maximum burst size defines the maximum amount of data (in 512 byte increments) that a device may transfer in or out before it is required to relinquish control of the SCSI bus.

It will be evident to a person having ordinary skill in the field of SCSI interface technology, that the disconnect-reconnect mode parameter page comprises parameters which define how a particular data storage device behaves with respect to the SCSI bus. In particular, these parameters control the time allocation characteristics defined for each data storage device connected to the bus.

In similar fashion, page 8 (08 h, hexadecimal), the caching page, comprises parameters which define the behavior of a data storage device with respect to the transfer of data between its control electronics and the data storage medium itself. The parameter fields comprising the caching page (page 8) that are able to be adaptively modified by the device driver, in accordance with the invention, are depicted in the FIG. 7, and include initiator control (byte 2 bit 7), abort pre-fetch (byte 2 bit 6), caching analysis permitted (byte 2 bit 5), discontinuity or DISC (byte 2 bit 4), size enable or SIZE (byte 2 bit 3), right cache enable (byte 2 bit 2), multiplication factor (byte 2 bit 1), read cache disable (byte 2 bit 0), demand read retention priority (byte 3 bits 4, 5, 6 and 7), write retention priority (byte 3 bits 0, 1, 2 and 3), disable pre-fetch transfer length (bytes 4 and 5), minimum pre-fetch (bytes 6 and 7), maximum pre-fetch (bytes 8 and 9), maximum pre-fetch ceiling (bytes 10 and 11), force sequential write of FSW (byte 12 bit 7), disable read-ahead or DRA (byte 12 bit 5), number of cache segments (byte 13), cache segment size (bytes 14 and 15), and non-cache segment size (byte 17, 18 and 19).

Operation of the Device Driver

Figure 8:
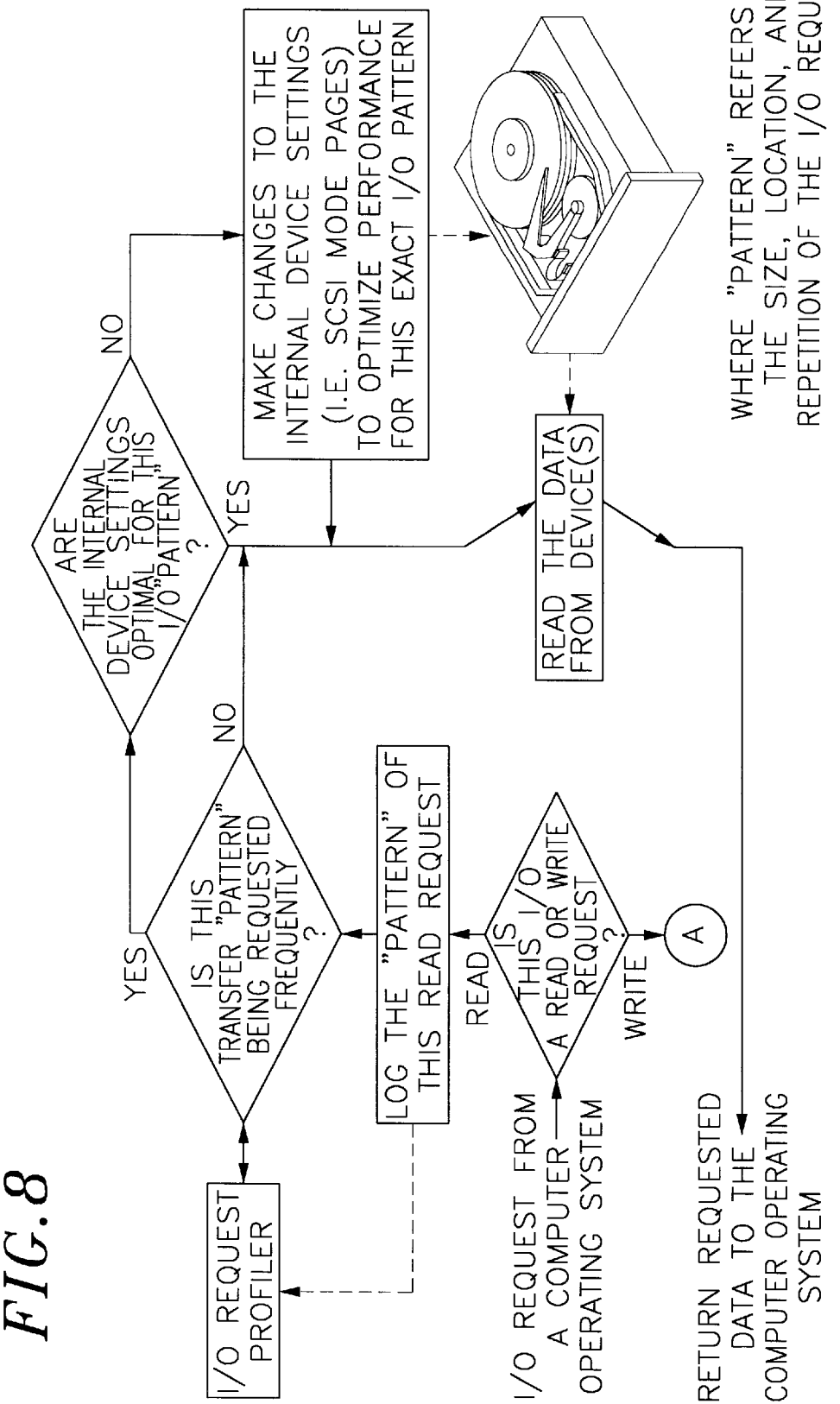
FIG. 8 a flow diagram depicting the operational sequence of a device driver constructed in accordance of practice of principles of the invention, during an exemplary I/O read operation.

The operation of a device driver, in accordance with practice of the principles of the present invention, will now be described with reference to the flow diagram of FIG. 8. At the beginning of the process, a computer's operating system, operating in accordance with an instruction set defined by a particular applications program, provides an I/O request to the device driver, for example, when a file is being refreshed or any other request for information is made to the operating system which cannot be accommodated by information stored in main memory. Following receipt of an I/O request from the operating system, the device driver first determines whether the I/O request is a read or a write request. This procedure is relatively straight forward because the type of data transaction is identified in the opcode field of a disk drive data transfer command. For example, various data transfer opcodes include two types of reads, two types of writes, read long, write long, write same, two types of seeks, each of which are identified by a specific hexadecimal code. Determining whether the data transfer request is a read or a write is important for the efficient operation of the device driver, in that various fields within the subject mode parameter pages are only concerned with the read characteristics of a target data storage device, while other fields are applicable only to a device's write characteristics. By determining whether an operating system I/O request involves a read or a write allows the device driver to make selective changes to only those appropriate corresponding fields comprising the mode parameter pages.

Following the read/write determination (in the exemplary flow diagram of FIG. 8 it is assumed that the I/O request is a read) the device driver examines the entire data transfer request from the operating system, including the entire command descriptor block, in order to determine and log certain parameters comprising the read request. In particular, such parameters preferably include, but are not limited to, whether the command is a read or read long, a sequential read, the absolute address of logical blocks being read, the size of the requested data transfer (whether 2 k, 4 k, 8 k, 16 k, 32 k, or 64 k transfer sizes), and the like. Each of these parameters are logged by the device driver and parameters of subsequent I/O requests are compared to the parameters of previous I/O requests, in order to determine if the I/O request stream comprises some sort of repeatable pattern. Thus, it may be seen that the device driver is able to categorize specific types of I/O requests, and log the pattern of a, for example, read request into a reserved memory area comprising a portion of its execution memory space.

Following logging of the parameters of the I/O read request, an I/O request profiler, comprising a subroutine within the device driver, evaluates the logged read request for particular patterns, by comparing the current request with recent prior requests. Patterns of interest to the I/O request profiler preferably comprise the size of the I/O request, the number of requests issued within a given time period (determined by setting a count-up flag every time an I/O request is issued), whether a specific request type is frequently repeated, whether there are more read requests than write requests (or vice versa) within a given time period, the absolute media position of the requests (as determined by evaluating the cylinder, head and sector fields of a logical data block), and particularly whether the I/O requests have been ascending, descending, or have been expressed with some degree of periodicity in absolute address.

Once a recognized pattern is identified the I/O request profiler passes control back to the main device driver routine which, in turn, determines whether this I/O transfer pattern is being frequently requested. If so, the device driver next determines whether the internal device mode parameter settings are optimal for the particular I/O pattern of interest. For example, the device driver may access an internal library of parameter settings for a pre-determined set of mode parameter page values which have been identified to the recognized I/O pattern and which are defined as optimal for the said pattern. Various mode parameter page values would typically comprise a library of values preloaded onto a particular data storage device itself, but could alternatively reside, in software, within the device driver, or in another RAM or ROM location within the address space of its execution environment. Libraries of preoptimized mode parameter page values, whether residing on the data storage device or in addressable memory space, would typically have been pre-recorded or pre-loaded before the device driver is called upon to execute an I/O command. The specific termination of which mode parameter page values to modify with regard to a particular I/O pattern will preferably have been predetermined outside of the run time environment. Predetermination of mode parameter page values would result from either empirical knowledge of the target data storage device, specific recommendations by the original equipment manufacturer of the device, empirical test data gathered in well known fashion outside of the run time environment, or from an I/O emulator which executes outside of the run time environment and which functions to characterize and profile the I/O performance of a particular data storage device as will be described in greater detail below. Such an I/O emulator simulates the anticipated run time environment of a particular data storage device and device driver combination in response to the demands of an emulated application.

In accordance with the invention, the device driver interrogates the data storage device (issues a mode sense command) to determine if the device is already programmed with the preferred set of mode parameter page values corresponding to the current I/O request pattern. If so, the device driver performs the I/O, in this case reads the requested data from the device, and returns control to the operating system. If the device driver determines that the device has not been programmed with the optimal mode parameter settings for the current I/O pattern, the device driver fetches the appropriate mode parameter page settings from the library, and writes them to the target data storage device via a mode select command to optimize device performance for the I/O pattern of interest. Following any necessary changes to the device mode pages, the device driver then executes the I/O request from the operating system, in this case reads the requested data from the device and returns control to the computer operating system.

Figure 9:
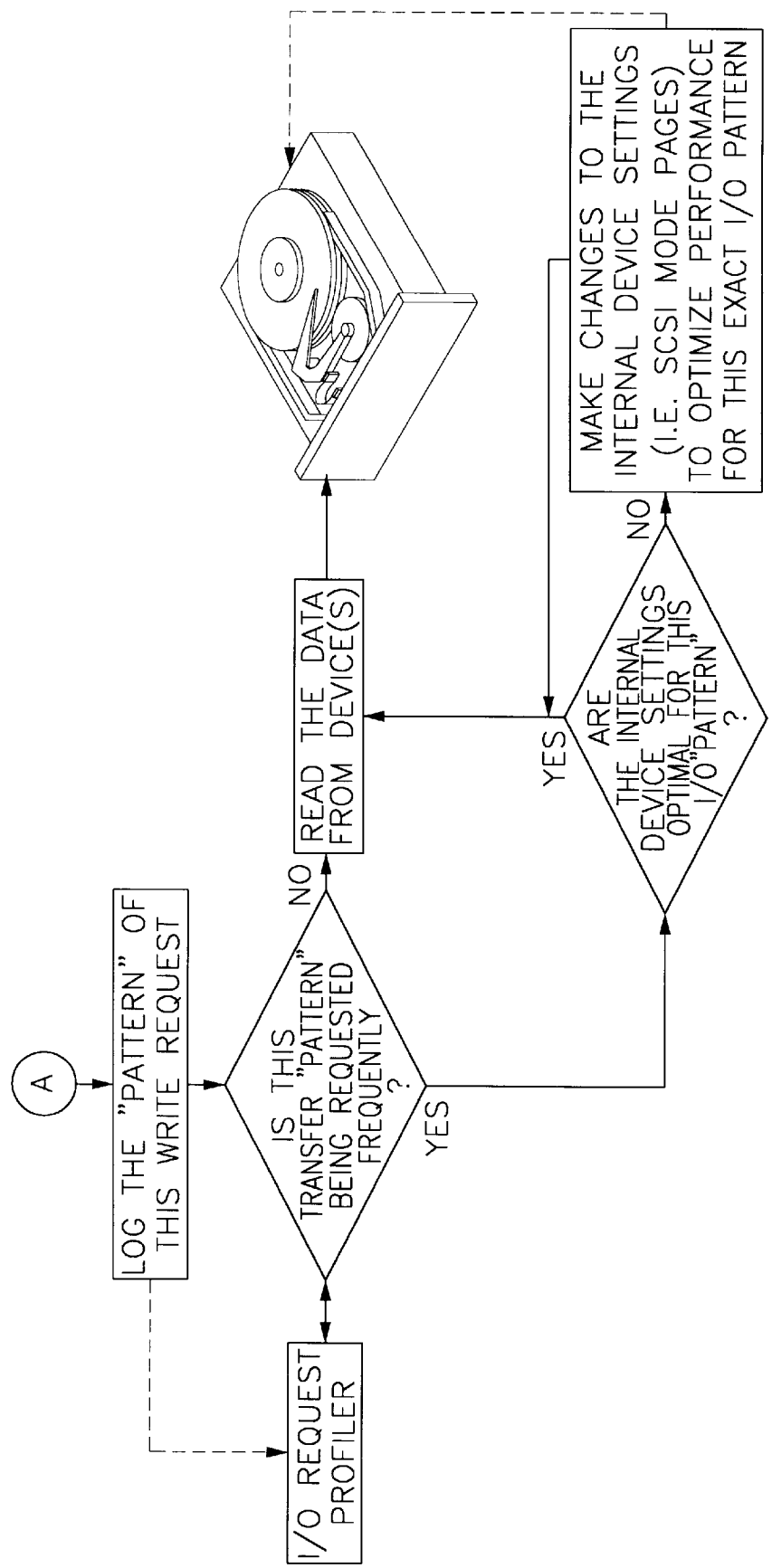
FIG. 9 is a flow diagram depicting the operational sequence of a device driver constructed in accordance of practice of principles of the invention, during an exemplary I/O write operation.

In similar fashion, if the I/O request received from the operating system is a write request, the device driver follows substantially the same procedure, as is depicted in the flow diagram of FIG. 9. Following determination that the I/O is a write request, the device driver again logs the "pattern" of the write request and determines whether the transfer pattern is being requested frequently, in conjunction with the I/O request profiler. If the transfer pattern is being frequently requested, the device driver next determines whether the internal device settings (the mode pages) are optimal for the particular I/O pattern of interest, and if so writes the data to the device and returns control to the operating system. If the internal device settings are determined to be not optimal for the particular I/O pattern of interest, the device driver again consults its library of mode parameters, selects a corresponding set of mode parameters which have been identified to that particular I/O pattern, and writes those mode parameters to the data storage device to optimize device performance for the specific I/O pattern. The device driver next exits the optimization subroutine and performs the I/O request by writing data to the storage device and finally returning control to the computer operating system.

In a second embodiment of a device driver operating in accordance with practice of principles of the invention, the device driver is able to optimize the data transfer performance of a particular data storage device even though it does not have access to a pre-defined library of internal device settings (mode parameter pages). As was described above, the header block of a data storage device's parameter list includes a byte which identifies the particular device type of any peripheral data storage device. In particular, disk drives manufactured by, for example, Western Digital Corporation of Irvine, California, are able to identify themselves by manufacturer and drive model, as well as by their data storage parameters such as number of heads, number of tracks, cylinders, pre-compensation, and the like. Accordingly, in well known fashion, a device driver is able to specifically determine the type of data storage device to which it is directing its attention. In accordance with the invention, if the device driver discovers that it does not have access to a particular data storage device's optimum I/O parameters, by comparing the device's identifier to the identifiers of the various mode parameter pages stored in its library, the device driver is able to command a series of I/O tests to the storage device which are designed to mimic the current I/O pattern being received from the operating system.

For example, if the current I/O pattern comprises a sequence of sequential writes, each write involving a transfer of data in 4 k blocks, the device driver is able to arbitrarily command a series of sequential 4 k data transfers, using arbitrarily selected absolute addresses, and a string of 1's which is 4 k in length. During idle periods, when no I/O requests were being made by the operating system, the device driver would command these emulated I/O tests to the data storage device and measure its data transfer rate performance after each test.

Next, the device driver iteratively changes the parametric value of selected 1's of the various fields within mode pages 2 and 8, depending on the particular sense of the I/O being emulated (whether the I/O is a read, write, etc.). Following each parametric change, the device driver recommands the emulated I/O tests and measures changes in the data transfer performance of the data storage device. Based upon the magnitude and the direction of the measured data transfer performance obtained after alteration of particular fields, the device driver next determines whether the particular field change resulted in a performance gain or loss. If a gain is recorded, the altered parameter field values are identified as gain values and those particular field values would again be adjusted in the same direction, and additional I/O emulation tests performed.

If the device driver determines that a performance change results in a loss, the driver reverts to the previous set of parameter values and subsequently reverses the direction of the value change of the next set of parameter values to be tried. This process is repeated iteratively, typically comprising several thousands of iterations, until the device driver determines, by the law of diminishing returns, that the process is complete. Alternatively, the device driver may be written to automatically terminate the emulated I/O tests after a predetermined number of iterations, such as 5,000. It will be evident to those having skill in the art, that the number of iterations required to zero in on an optimal set of parameters for a particular I/O pattern, will depend upon the nature of the I/O pattern being emulated. Relatively simple I/O patterns, such as sequential reads or sequential writes will require a fewer number of trials before the optimum data storage device response parameter set is achieved. In contrast, relatively complicated "flare" or "butterfly" patterns (reads or writes to inside then outside tracks in an increasing/decreasing fashion), spiral I/O's, or reads followed by writes in an alternating increasing or decreasing periodic fashion, will require a significantly greater number of iterations in the emulated I/O tests in order to adequately determine the optimal parameter set for optimal data throughput performance.

Following the emulated I/O tests, the device driver records the best value settings obtained for that particular I/O pattern, by appending them to the library of internal device settings or by creating a new library of settings if such a library does not already exist. Then, during subsequent I/O requests from the operating system this new library of values is accessed in just such a manner as if they had been pre-determined and preprogrammed as discussed above in connection with the first exemplary embodiment.

It should be noted, that if the operating system issues an I/O request to the device driver while the driver is performing the above-described emulated I/O tests, the device driver immediately suspends the emulated I/O tests until the I/O request is completed, control is returned to the operating system, and idle time is again available.

An additional feature of this exemplary embodiment of a device driver in accordance with the invention, is that the driver automatically records the new library of "derived" mode page values to a reserved portion of the media on the storage device (disk drives configuration sector) so that if the device is physically removed and connected to another computer system, the new host computer would receive the benefit of these newly derived performance tuning values, as well as the full library of other optimized settings (if available), without having to reperform the I/O emulation tests so as to rediscover them.

In addition to operating in conjunction with the I/O profiler subroutine in order to identify patterns in an I/O request stream, to be described in greater detail below, the device driver is also able to predict an I/0 request pattern as it is in the process of forming, and is able thereby to execute anticipatory mode page changes. As an example, if the operating system's I/O request stream includes a repeating I/O request which continually requests the same range of data from the data storage device, i.e., the same address is relating to a 64 k block of data, the device driver is able to command new mode page settings in anticipation of this particular I/O request being repeated. The new mode page settings would, of course, comprise those which have been determined to favor a repeating data range.

In an additional example, the operating system may issue a series of I/O requests which is beginning to exhibit a trend toward sequential data accesses. Before the I/O stream establishes a predetermined number of "hits" in the I/O profiler to establish the I/O stream, as, indeed, comprising a sequential data access pattern, the device driver is able to nevertheless command new mode page values which favor sequential data requests. Accordingly, the device driver is able to predict or anticipate certain I/O patterns prior to those pattern's being fully recognized by the I/O request profiler.

The manner in which the device driver performs this anticipatory identification procedure is very similar to the manner in which the I/O profiler identifies particular I/O patterns in the I/O request stream. In particular, the I/O profiler is able to be preprogrammed to recognize a large plurality of data transfer patterns. The nature of each of these transfer patterns has typically been predetermined by an empirical evaluation of the manner in which various software applications, hosted by particular computer systems, tend to move data onto and off of various data storage devices. For example, the MacIntosh operating system frequently accesses the last block (specifically, the last block-1) of a data storage device during a conventional read or write operation. If this read or write command accesses a leading block of any particular device, a data transfer pattern known as a "flare" or "butterfly" transfer pattern may be identified. This pattern is typically characterized by an access call to an address on an outside track of, for example, disk drive, followed by an access call to the address of the last block of the device on the inside track. This alternating inside then outside transfer pattern may additionally include increasing or decreasing address calls on either the inside tracks, the outside tracks, or both.

With regard to the DOS operating system, each time a data sector, or record, has one of its parametric values changed, for example by being written to and thereby changed in length, these changed parameters must be recorded in the file allocation table (FAT) located in a set of reserved sectors on one of the outer tracks of the disk drive. Accordingly, when records being read from or written to are on the inside tracks, the butterfly or flare I/O pattern is observed in DOS applications as well.

Additionally, a further type of I/O pattern, termed a "spiral" I/O, has been empirically observed, and may be thought of as comprising a type of modified sequential I/O which may include track jumps. Spiral I/O's might be characterized by a request to read, for example, 25 sequential addresses, skip the next sequential 200 addresses, read the next sequential 25 addresses, skip 200 addresses, and so on.

It should be evident to a person having ordinary skill in the field of data I/O, that there are various I/O patterns that are easily empirically observable and, thus, characterizable and reproducible. If any I/O request stream admits of any degree of periodicity or defines a characterizable trend, that I/O pattern is able to be defined by, for example, a direction vector, a magnitude vector, a periodic function, or any combination thereof. Pattern parameters, once defined, are coded in software as an I/O pattern table, in a manner directly analogous to the creation of a character table for use by an optical character recognition system (OCR). As new I/O patterns are identified, they are easily added to the pattern table by merely including additional lines of code to the software program. Thus, it can be seen that any pattern which is observable in an I/O request stream may be made recognizable to the I/O profiler by means of preprogramming that pattern into a pattern recognition table.

The I/O profiler is a software subroutine portion of the device driver, which functions to evaluate the parameters of an I/O request stream and compare those parameters to its table, or library, of known I/O patterns. Once a pattern match has been found, the I/O request profiler identifies the pattern back to the device driver's main execution routine, which takes appropriate action. Although the I/O request profiler is able to recognize many different forms of I/O request patterns, each request pattern has specific parameters which identify it that have been preprogrammed into the software. For example, the software developer may have written the I/O request profiler to recognize a repeating data I/O request after the request has been issued for the same address or set of addresses 50 times. Thus, if the I/O request stream is inconsistent, i.e., if the request for a set of addresses repeats 37 times, and then 37 more times, interrupted by a single, inconsistent track jump, the I/O request profiler may not recognize the repeat request, because the number of repeats has not reached the preprogrammed threshold.

In accordance with practice of principles of the invention, the device driver's main routine may easily be programmed to a much lower threshold for recognizing a more limited number of I/O request patterns. For example, the device driver itself may be programmed to recognize a sequential read or sequential write after the address counter indicates, say a series of 20 sequential addresses, rather than the 50 required by the I/O profiler. Also, the device driver may recognize a repeat I/O request following a series of 20 requests for the same address or set of addresses, rather than the I/O request profilers 50. In this manner, the device driver is able to "anticipate" an I/O request pattern as it is forming, rather than to wait for the I/O request profiler's confirmation of a particular pattern. Thus, even though it may be determined that 50 I/O accesses to a particular address or a set of addresses, in a given time period is the empirically determined threshold for a true repeat I/O request pattern, the device driver may easily be programmed, or reprogrammed as many times as is necessary, to accommodate a lower threshold value for a selected few I/O patterns in the interest of flexibility.

It has been determined by inventors of the present invention, that by careful observation of the nature and history of the I/O requests being made by an operating system, the device driver can be programmed to be quite successful with its predictions, and its consequent selection of new mode page values for a particular data storage device. Actual data transfer rate testing, performed in a laboratory environment, on a computer system comprising the embodiments of the invention described above, have demonstrated reproducible performance gains ranging from 28% to over 116% over a conventional, "non-optimizing" version of the same software device driver.

I/O Emulator

It will be readily understood that while the operation of the device driver and its associated I/O request profiler has been discussed above with respect to operation in a run time environment, the manner in which the driver optimizes a data storage device for maximum data transfer or throughput performance, may be easily accommodated by a stand alone program which evaluates an I/O request stream from a particular software application or operating system, and is able, thereby to develop a library of optimum mode parameters for controlling a data storage device when such an application or operating system is running. In addition, it may be seen that such a stand alone program is also able to "profile" a particular data storage device's data transfer performance with respect to various I/O request patterns, by merely arbitrarily commanding a particular I/O pattern and observing the data storage device's transfer response thereto. Thus, it may be seen that the device performance optimization software system and method in accordance with the present invention may be embodied in a stand alone utility program, executable by a computer system outside the run time environment.

Figure 10:
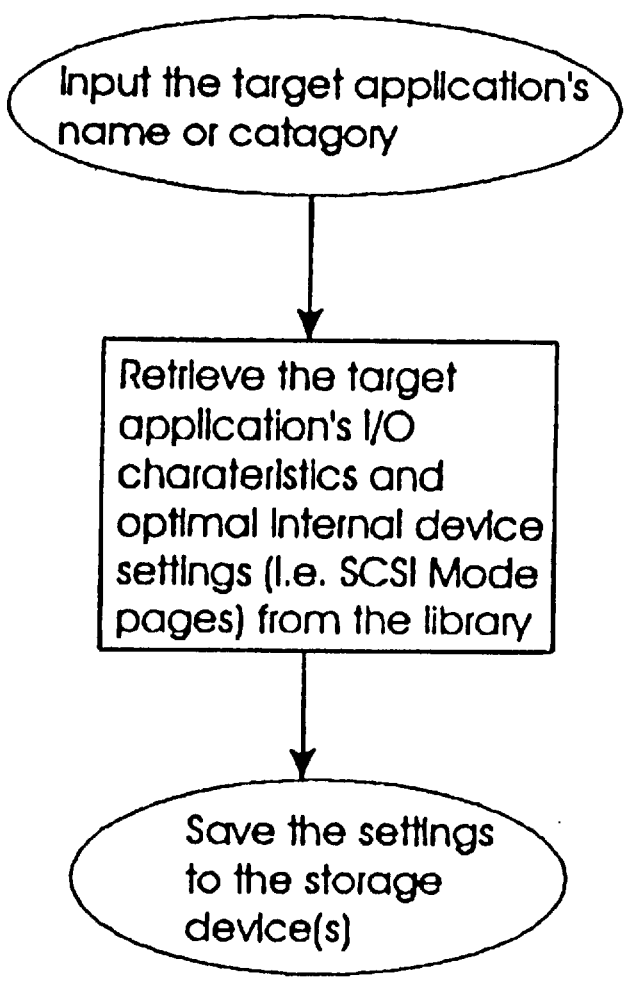
FIG. 10 is a flow diagram depicting the operational sequence of a first embodiment of an I/O emulator, optimizer and characterization software program in accordance with practice of principles of the invention.

The sequence of operations of a first embodiment of a software program in accordance with practice of principles of the invention, is depicted in FIG. 10. In the illustrated embodiment of FIG. 10, a user of the software utility is assumed to have available, from a list or menu, the name or title of various target application programs or operating systems which are hosted by the computer system. After invoking the utility program, in conventional fashion, by clicking on its icon (in a GUI environment) or calling its execution file, the utility program prompts the user to select a target application or operating system for processing by the program. The user then inputs the target application's name, title, or category into an appropriate field. Once selected, the utility program reretrieves a set of predetermined I/O characteristics from its library, which have been identified to and characterize the selected application's I/O patterns. For example, the types of pattern information that may be stored in the library would include the typical size of I/O requests made by the specific application, the typical number of I/O requests made by the application within a given time period, a flag as to whether the application frequently makes repeated I/O requests for the same ranges of addresses, a flag as to whether the application typically issues more read requests than write requests, (or vice versa), whether that application typically issues sequential data access calls, whether the application favors ascending or descending data addresses, and the like. These types of pattern information can be easily acquired from the more popular application programs, by evaluating and characterizing an application's I/O request stream by, for example, a bench top logic analyzer. This information can be preprogrammed into various library files which are accessible to the utility program. Alternatively, these types of pattern information are able to be determined by the software utility itself, in a manner to be described in greater detail below, and either appended to a pre-existing library of information, or a new library created.

Following receipt of an application's I/O characteristics data, the utility program searches its library files for a particular set of mode page values which have been characterized and flagged as pertaining to the previously retrieved I/O characteristics. As was the case with the embodiments of the invention described in connection with the device driver, above, the present invention is illustrated in the context of the SCSI interface and its associated protocols. Accordingly, the mode parameter page values referred to above, pertain to mode parameter pages 02 h and 08 h which are defined by the SCSI specification.

Following retrieval of an appropriate set of mode page values, the utility program would command new parameter mode pages 02 h and 08 h, with the preferred values, to be written to the data storage device. Operating in response to the new parameter settings, the data storage device is now optimized for the highest possible transfer speed between the device and the host system while that particular application program is executing.

If no preprogrammed information is available regarding the I/O characteristics of a particular software application program, an additional embodiment of the utility program allows the program to "snoop" the target application program or operating system, and extract its typical I/O request behavior characteristics.

Figure 11:
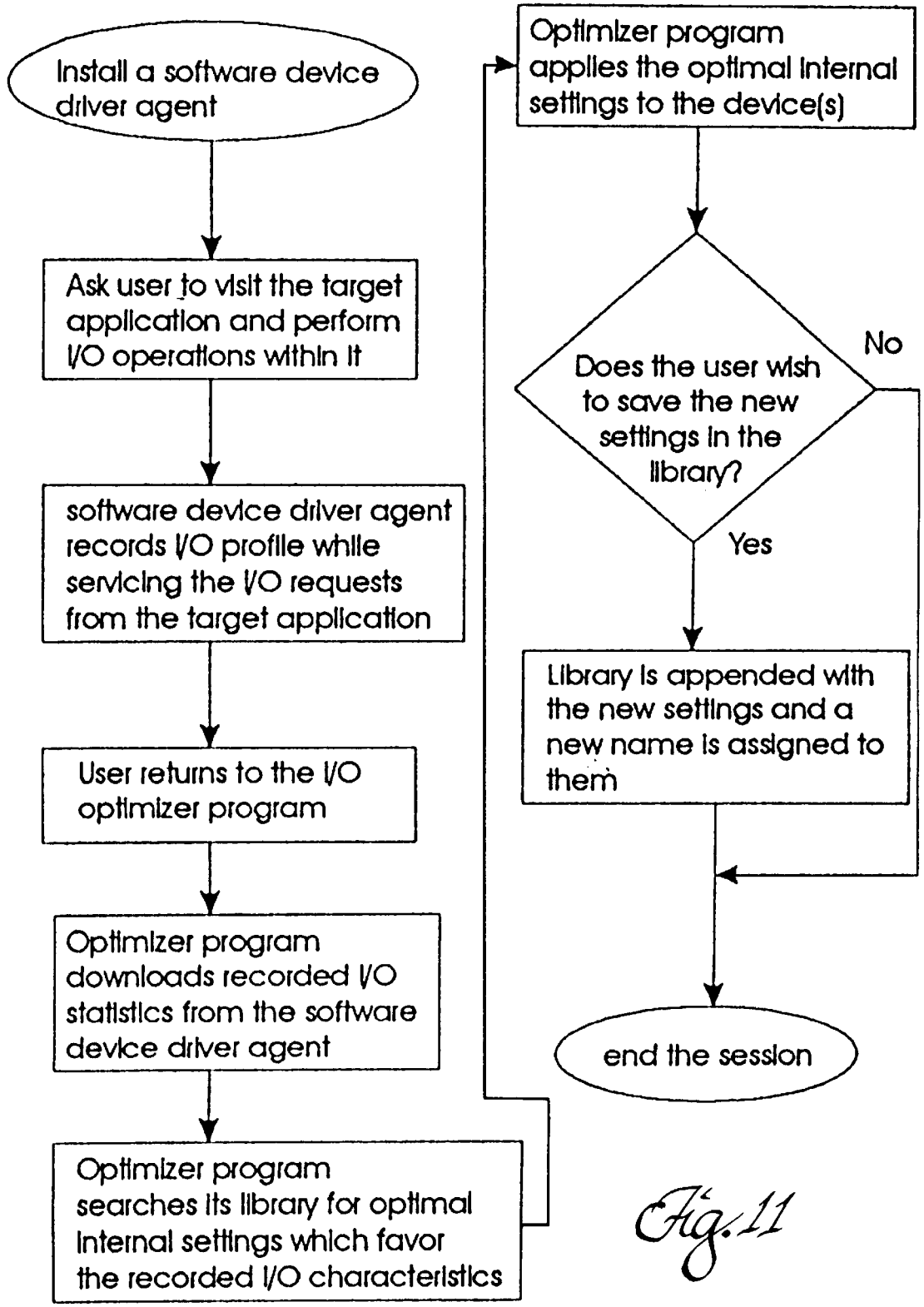
FIG. 11 is a flow diagram depicting the operational sequence of a second embodiment of an I/O emulator, optimizer and characterization software program in accordance with the present invention.

Turning now to FIG. 11, which is a flow diagram of the operational sequence of this additional embodiment of an I/O emulator utility program, a typical program session would begin, following launch of the utility program, by the utility program's installing, in main execution memory, a software device driver capable of logging I/O statistics, such as a device driver described in connection with earlier embodiments of the invention. The device driver registers itself with the host computer operating system, in a well known fashion, appropriate for the host computer system, and installs itself between the application program to be "snooped" and the target data storage device. In both Windows and MacIntosh environments, this would typically be achieved by having the device driver declare itself as the controlling device driver for a target data storage device, such as a disk drive.

After the software device driver is installed, the I/O emulator utility program next instructs the user to visit, or launch, the target application program and perform operations within the target application which compels the application to perform I/O requests involving the target data storage device. As an illustrative example, such operations might include loading or opening files from within the target application, and saving such files back to the target data storage device. In addition, if the target application was a relational data base program such as FoxBase, the user might command recalculation of various data fields involving the fetching and opening of various adjunct files, or, if the application was a digital video editing program, it could be instructed to start saving captured digital video data to the subject's data storage device. Regardless of the type of application, the installed software device driver, functioning as an agent for the I/O emulator utility program, gathers and logs I/O statistics, in a manner described above, which will be used to create an I/O profile for the target application program, while the driver services the target application's I/O requests.

Following exercise of the target application program, the user returns to the I/O emulator utility program, which next downloads the recorded I/O statistics logs from the software driver agent and constructs an I/O profile for the target application program from the I/O statistics data. Typically, an I/O profile includes the I/O characteristics and patterns required by the utility to create or retrieve an appropriate set of mode page values for optimizing or "tuning" a data storage device specifically for the particular observed I/O pattern and behavior.

As an illustrative example of I/O characteristic logging, if the application program being exercised is, for example, a word processing program such as Microsoft Word or WordPerfect, one of the I/O characteristics that may be logged would be the size of data transfer requests. Particularly, the I/O emulator utility program may easily include a graphics engine which allows plotting of various I/O statistics to the computer screen for visual evaluation by the user. While "snooping" the target application, the I/O emulator might prepare a graph of the cume of data transfer request sizes. Accordingly, in the context of a word processing application, the graph might reveal that the majority of data transfer requests comprise a transfer size of approximately 4 k bytes, while 1 to 2 percent of the data transfer requests comprise a transfer size of 512 bytes to 1 k bytes, and approximately 4% of the data transfer requests comprise block sizes of approximately 4 k bytes or in excess thereof. Accordingly, one of the log I/O statistics for that particular target application would be that the application requests data in transfer sizes of approximately 2 k bytes.

Following downloading of the logged I/O statistics for the target application program, the I/O emulator utility program consults its library of mode page values for a library page which corresponds to the observed I/O statistics of the target application program. After the program determines an appropriate set of mode page values which would optimize the data storage device for data transfers having the recorded I/O characteristics, it would command them to be written to the data storage device which would then be optimized for the fastest possible data transfer performance with respect to the target application software program.

This step typically completes an I/O emulator utility program session, but the user may, optionally, add the newly acquired I/O characteristics of the application program to the utility's program library. If the program is written to accommodate this option, and the user elects to perform this function, the user would be requested to input the name of the target application which had just been "snooped". This application would then be added to the emulator's program list or menu, and identified by the name, so that the user is able to select this application in the future. The "snooped" application's I/O characteristics are then appended to the emulator program's library and tagged with the application name for future reference, should the user wish to optimize a different data storage device for the same target application program at some later time.

A yet additional embodiment of the emulator utility program in accordance with the present invention, concerns optimizing a data storage device's data transfer performance even when a target application program is not available for execution, or simply if the user wishes to "ultra fine tune" the performance of a particular data storage device.

Figure 12:
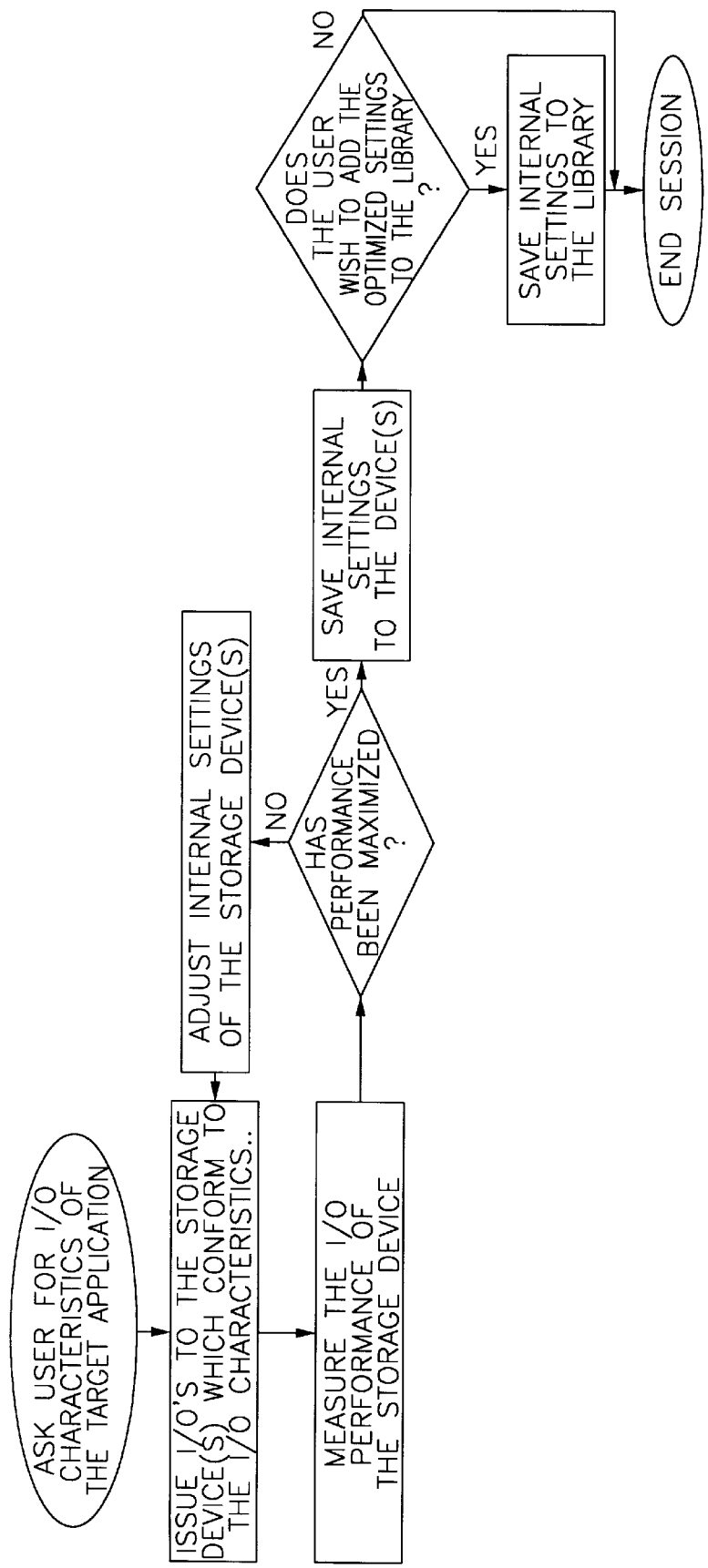
FIG. 12 is a flow diagram depicting the operational sequence of a third embodiment of an I/O emulator, optimizer and characterization software program in accordance with the present invention.

Turning now to FIG. 12, there is depicted an operational flow diagram of an iterative optimization system and method implemented by an I/O emulator software utility program in accordance with practice of principles of the present invention. In FIG. 12, the program session begins by a request to the user to input any known I/O characteristics available for a target software application program or operating system. An example of such a request would be for the typical I/O transfer size most often used by the target application program, in bytes, kilobytes, or megabytes. If such information about the application program is unavailable, the program generally inputs a default value (1 k or 2 k bytes) in the query response field.

Following initialization with either user provided inputs and/or default values, the program begins a suite of iterative optimizing operations which make predetermined changes to a data storage device's mode page settings, while evaluating its data transfer performance after each change. When changes to the mode page settings produce performance gains, the values are recorded in temporary, or scratch, memory, and when changes to the mode page settings produce performance losses, they would be discarded and replaced with new values. More particularly, the optimizer routine may, for example, be programmed to substitute the values from 0 to 255 into the Buffer Full Ratio field (byte 2) of parameter mode page 02 h (the disconnect-reconnect page). After each new value is entered, the optimizer program performs a data transfer test on the data storage device. If the test returns improved data transfer performance values than a previous trial, the optimizer program then increases the value of the Buffer Full Ratio Field, for example by 1, and reruns the data transfer performance trial. So long as the mode page value setting changes provide performance gains, the optimizer program continues to increment the parameter values in the same vector direction as that providing improved performance. If data transfer trials produce performance losses, then the optimizer program reverses the vector direction of the mode page setting values automatically.

Thus, if a Buffer Full Ratio of value change from 49 to 50 produced a performance loss, the optimizer program reverses the vector direction and enters 48 for the Buffer Full Ratio for the next performance trial. This process continues until all of the fields available (and supported by the data storage device) in all of the mode pages being exercised (the disconnect-reconnect and caching pages in the exemplary embodiment) have been performance trialed with all possible values.

When the process is complete, i.e., when data transfer performance has been maximized, the optimizer program will have defined the mode page values which have caused the data storage device to exhibit the best overall data transfer performance.

A particular feature of this iterative optimization method, is that the granularity of the individual performance tests may be easily adjusted by an operator of the program, in the interest of reducing the time required to perform a complete optimization of the data storage device at the cost of ultimate resolution of "ultra fine tune" parameters. For example, an operator of this iterative type of emulator session can input criteria for value change directions, automatic field increment/decrement values, i.e., the value by which to increase or decrease a mode page field, by increments of 5 to 10 for each trial, rather than the default value of unity (1). The operator may also input criteria for which mode page fields to alter, the number of trials to perform for each mode page field change, whether to audit earlier mode page field values after making changes to other mode pages and fields, or whether or not to stop the trial process if numerous value substitutions produced no change in the performance of the data storage device, or to terminate the trial if a certain period of time has elapsed regardless of the outcome.

This type of iterative emulation session is of particular benefit in that while the optimizer program is executing the performance trials, it is also constructing an I/O profile for the data storage device based upon the results of these trials. This resulting I/O "device" profile is saved into the optimizer program's library for future reference, so that if this data storage device is encountered in the future, the optimizer program's default values for an iterative session would represent "preoptimized" values for that specific type of data storage device. This would greatly reduce the amount of time required to "fine tune" the data transfer characteristics of the particular data storage device in question.

In accordance with practice of principles of the invention, a device driver has been described which operates in conjunction with a host computer's operating system to handle I/O requests made by a particular application program to any one of a multiplicity of peripheral data storage devices. The device driver is typically implemented as a software program and is executable either automatically, by an operating system as the result of an I/O request by an application program, or is executed by an affirmative call from, for example, a user. In addition to providing a suitable response to an I/O request from an operating system, the device driver is able to evaluate the nature of the I/O requests being issued by a particular application program and, in response, adaptively adjust a data storage device's internal performance parameter settings in order to reconfigure, or optimize the data transfer performance of a particular data storage device to the specific I/O characteristics of any given application's program.

In addition, the device driver includes means for profiling an I/O request stream, created by an application program, and comparing the profile parameters to a library of predetermined I/O patterns. Means are also provided for matching the pattern characteristics of an I/O request stream to particular ones of the predetermined I/O patterns and identifying particular corresponding ones of a set of internal device performance parameters which optimize the data throughput characteristics of a data storage device to the matched I/O pattern.

Although the device driver has been described in the context of a host computer system and peripheral data storage device coupled together by means of an SCSI interface, it will be readily understood by one having ordinary skill in the art that the device driver of the present invention may be readily implemented to communicate with data storage devices coupled to a host computer over other interface bus architectures. The particular examples used in the illustrated embodiments, relate to commands, opcodes, and parameter pages as they relate to a disk drive coupled to an SCSI bus. However, the device driver is equally applicable to disk drives coupled to a host computer system over an IDE bus. In this case, the parameters which control the configuration of the drive, its associated cache, read and write buffers, are controlled in accordance with the various IDE commands of the ATA standard (in particular the identify command, ECh). In addition, IDE drives comprise a reserved media space, termed the configuration sector, which contains the drive's basic operational firm wear. This configuration sector is accessible to a disk drive engineer having ordinary skill, and the configuration data written therein may be easily evaluated and modified in accordance with the practice and principles of the present invention.

It should also be understood that the I/O emulator utility program of the present invention may be interactively accessed by a user through a graphical user interface (GUI). The I/O emulator utility program may additionally comprise a graphing utility, an internal, interactive, menu capability, and various control features that would allow a user to invoke one, many, or none of the optimization routines of the utility program. In addition, as has been mentioned previously, the I/O emulator program may include the device driver of the present invention as an executable I/O client services provider, as a subroutine portion of the executable code of the application. Moreover, the device driver may reside at the operating system level of a host computer, or alternatively, be provided as a device driver subroutine in conjunction with an application program. Thus, the device driver may be invoked by an operating system regardless of the application being hosted by the operating system, or the driver may be invoked by an application program, regardless of the operating system which is hosting the program.

The above description of the preferred embodiments of a method and system for optimizing the I/O response characteristics of a data storage device, provided in accordance with the invention, is for illustrative purposes. Because of variations which will be apparent to those skilled in the art, the scope of the present invention is not intended to be limited to the embodiments described above, but rather is defined by the following claims.

What is claimed is:

1. In a computer system executing application programs under operating system program control, the computer system including a peripheral interface configured to transfer data between a host computer and a peripheral data storage device in an I/O request stream, the peripheral data storage device further operable to transfer data to and from the host in accordance with a set of configurable, performance setting parameters defining a data transfer performance, the computer system comprising:

a device driver for providing I/O requests from an application program executing on the host computer system to the peripheral data storage device in an I/O request stream, the device driver further comprising;

means for extracting selected ones of a multiplicity of I/O request type characteristics from the I/O requests of the stream, the extracted characteristics defining a profile of the I/O request stream;

means for identifying the profile of an I/O request stream to a selected one of a plurality of sets of predetermined I/O request patterns;

means for identifying the selected one of the plurality of sets of I/O request patterns to a corresponding one of a set of predetermined data storage device performance setting parameters, the identified performance setting parameters set operative to optimize data transfer performance of the peripheral data storage device for the identified I/O request pattern.

2. In a computer system executing application programs under operating system program control, the computer system including a peripheral interface configured to transfer data between a host computer and a peripheral data storage device in an I/O request stream, the peripheral data storage device further operable to transfer data to and from the host in accordance with a set of configurable, performance setting parameters defining a data transfer performance, the computer system comprising:

a device driver for providing I/O requests from an application program executing on the host computer system to the peripheral data storage device in an I/O request stream, the device driver further including means for logging selected ones of a multiplicity of I/O request type characteristics from the I/O requests of the stream;

an I/O profiler for determining whether the logged I/O request type characteristics correspond to a particular one of a plurality of sets of predetermined I/O request patterns, the I/O profiler including means for identifying the selected one of the plurality of sets of I/O request patterns to a corresponding one of a set of predetermined data storage device performance setting parameters, the identified performance setting parameter set operative to optimize data transfer performance of the peripheral data storage device for the identified I/O request pattern;

means for commanding the chosen set of predetermined data storage device performance setting parameters to the peripheral data storage device such that the commanded performance setting parameters define an optimized data transfer performance for the device.

3. In a computer system executing application programs under operating system program control, the computer system including a peripheral interface configured to transfer data between a host computer and a peripheral data storage device in an I/O request stream, the peripheral data storage device further operable to transfer data to and from the host in accordance with a set of configurable, performance setting parameters defining a data transfer performance, a method for optimizing data transfer performance of the peripheral data storage device comprising;

providing a device driver which services I/O requests from an application program executing on host computer system to the peripheral data storage device in an I/O request stream;

extracting selected ones of a multiplicity of I/O request type characteristics from the I/O requests of the stream, the extracted characteristics defining a profile of the I/O request stream;

identifying the profile of an I/O request stream to a selected one of a plurality of sets of predetermined I/O request patterns;

identifying the selected one of the plurality of sets of I/O request patterns to a corresponding one of the set of predetermined data storage device performance setting parameters, the identified performance setting parameters set operative to optimize data transfer performance of the peripheral data storage device for the identified I/O request pattern; commanding the identified performance setting parameter set to the peripheral data storage device;

operating the data storage device in accordance with the commanded set of performance setting parameters.

* * * * *